US011919017B2

(12) United States Patent
Cheng

(10) Patent No.: US 11,919,017 B2
(45) Date of Patent: Mar. 5, 2024

(54) WATER SPRAY GUN

(71) Applicant: YUAN-MEI CORP., Changhua County (TW)

(72) Inventor: Chi-Han Cheng, Changhua County (TW)

(73) Assignee: YUAN MEI CORP., Changhua County (TW)

(*) Notice: Subject to any disclaimer, the term of this patent is extended or adjusted under 35 U.S.C. 154(b) by 0 days.

(21) Appl. No.: 18/120,357

(22) Filed: Mar. 10, 2023

(65) Prior Publication Data

US 2023/0201854 A1 Jun. 29, 2023

Related U.S. Application Data

(62) Division of application No. 16/897,286, filed on Jun. 10, 2020, now Pat. No. 11,623,235.

(51) Int. Cl.
*B05B 12/00* (2018.01)
*B05B 9/01* (2006.01)

(52) U.S. Cl.
CPC ............ *B05B 12/0026* (2018.08); *B05B 9/01* (2013.01)

(58) Field of Classification Search
CPC .... B05B 12/0022; B05B 12/0026; B05B 9/01
See application file for complete search history.

(56) References Cited

U.S. PATENT DOCUMENTS 6,027,045 A * 2/2000 Shen ......................... F16K 1/38
239/525
6,520,427 B1 * 2/2003 Chen ..................... B05B 1/3013
239/526

* cited by examiner

*Primary Examiner* — Tuongminh N Pham
(74) *Attorney, Agent, or Firm* — Xuan Zhang

(57) ABSTRACT

A water spray gun includes a main body, an operating member and a switch part. The main body includes a handle portion and a tube portion extended from the handle portion and provided with a spray head. A control assembly is enclosed in the main body for control of water outflow and adjustment of the amount of the water outflow. The operating member is pivotally connected to the position where the handle portion meets the tube portion. The switch part is arranged at the operating member and is engaged with the control assembly. The amount of water outflow is controlled by relative movement between the switch part and the operating member.

3 Claims, 14 Drawing Sheets

WATER SPRAY GUN

CROSS REFERENCE OF RELATED APPLICATION

This is a Divisional application that claims the benefit of priority under 35 U.S.C. § 121 to a non-provisional application, application Ser. No. 16/897,286, filed Jun. 10, 2020.

BACKGROUND OF THE PRESENT INVENTION

Field of Invention

The present invention relates to a water spray gun, especially to a water spray gun in which a locked state and an unlocked state are easily switched by pressing an operating member and a switch part for control of outflow of water and adjustment of the amount of the water outflow.

Description of Related Arts

Referring to U.S. Pat. No. 7,434,750, a liquid dispensing pistol for gardening is revealed. The liquid dispensing pistol for gardening is made up of an external casing formed by a pipe and by a handle, a start lever for operation and a button elastically supported by the lever. The external casing is passed through by a channel within which a valve is sliding housed which is biased by a spring and is operable by the start lever turnable between a closing position and a maximum opening position of the valve. A device is made up of the button for the locking/unlocking of the lever in the maximum opening position.

Referring to EP Pat. No. 3116657 B1, a water application device with arrest function may include a main body graspable along a handle portion thereof by an operator and an operable member. The operable member may be pivotally attached to the main body. One of the operable member or the main body may include a locking member. The locking member may have a locked position and an unlocked position defined by movement of the locking member relative to a locking head of the locking member, Compression of the operable member with the locking member in the locked position may transition the operable member alternately between a locked state and an unlocked state with each compression.

However, the operating member in the above prior arts has one end pivotally connected to a water-intake portion close to the main body. A locking assembly is disposed on a connection between the operating member and the water-intake portion for easily locking or unlocking the operating member. Thereby a channel in the water spray gun can be opened or closed by the operating member for control of outflow of water. There is only a single function provided.

SUMMARY OF THE PRESENT INVENTION

Therefore it is a primary object of the present invention to provide a water spray gun in which an operating member is not only controlled by one hand and locked at the desired position, but also used for multi-stage adjustment of the water outflow. Moreover, the operating member is ergonomically designed and more labor-saving in use.

In order to achieve the above object, a water spray gun according to the present invention includes a main body, an operating member, a switch part, and a positioning portion. Users can hold a handle portion of the main body and press the operating member at the same time. A passage is enclosed in the main body and composed of a water-inlet portion and a water-outlet portion. A control assembly is disposed on a connection between the water-inlet portion and the water-outlet portion for control of outflow of water so that the water is sprayed out from the water spray gun. The operating member includes a first end and a second end pivotally connected to a connection end of the handle portion. The switch part is disposed close to the second end of the operating member and is engaged with the positioning portion of the control assembly. A locked position and an unlocked position of the switch part are defined by relative movement of the switch part to the positioning portion and engagement/disengagement between the switch part and the positioning portion. The switch part is switched between the locked state and the unlocked state alternately along with the pressing of the operating member while the operating member is at the locked position. When the switch part is at the unlocked position, the operating member is unlocked no matter being pressed or not. When the switch part is at the locked position, the switch part is in contact with the positioning portion and used in combination with the control assembly alternately to control outflow of water and multi-stage adjustment of the amount of the water outflow.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

The followings are embodiments of the present invention with detailed description and reference to the related figures to confirm that the present invention meets the requirements of the law. It should be understood that the operable connection, conjunction, or coupling herein means directly or indirectly connection, conjunction, or coupling. In a preferred embodiment, the direct/indirect connection, conjunction, or coupling makes a plurality of elements with respective functions connect or couple to one another to be operable.

In some embodiments described herein, an improved design of a water spray gun is provided.

Figure 1:
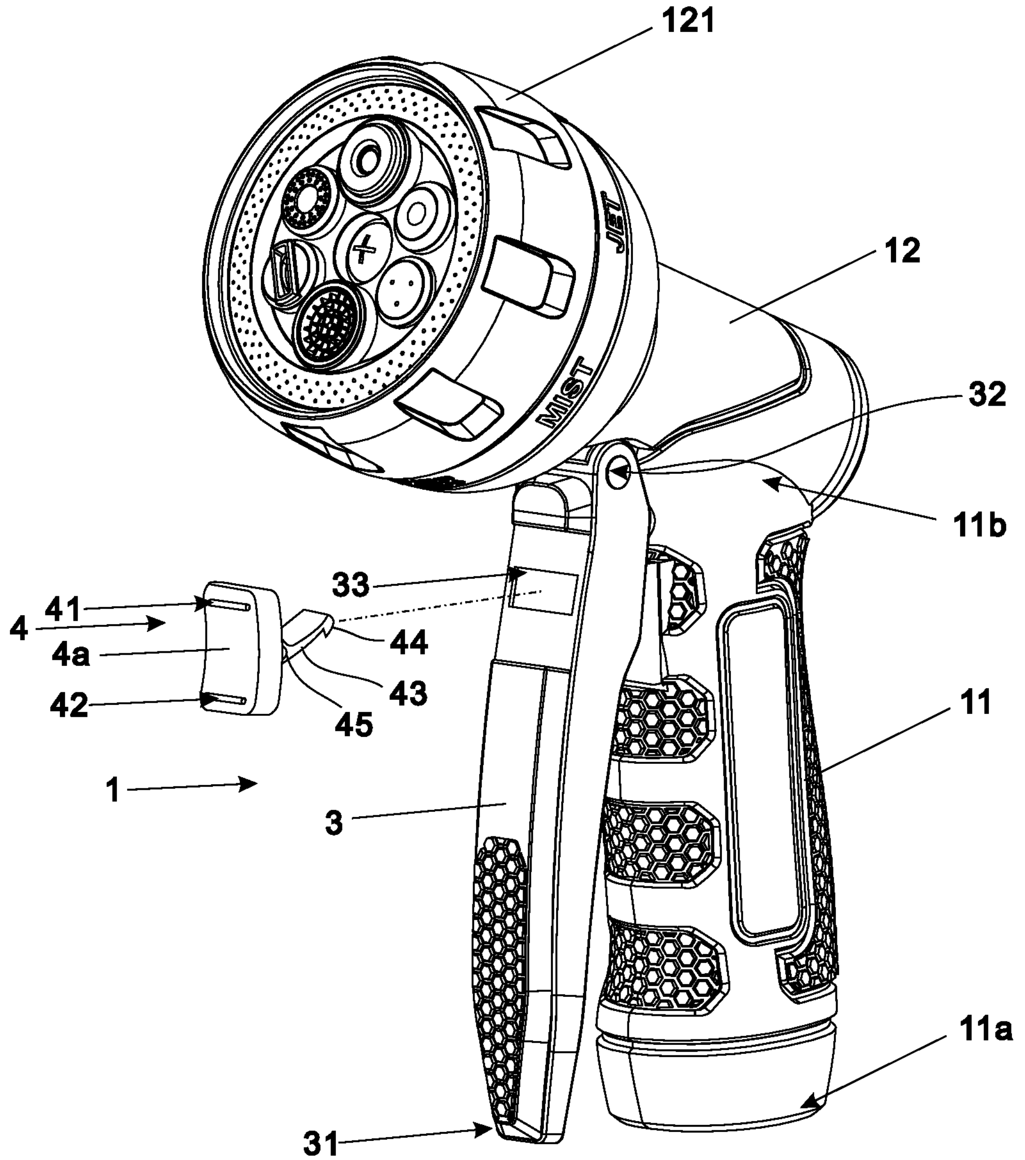
FIG. 1 is an explosive view of a main body and a switch part of an embodiment according to the present invention.
Figure 2:
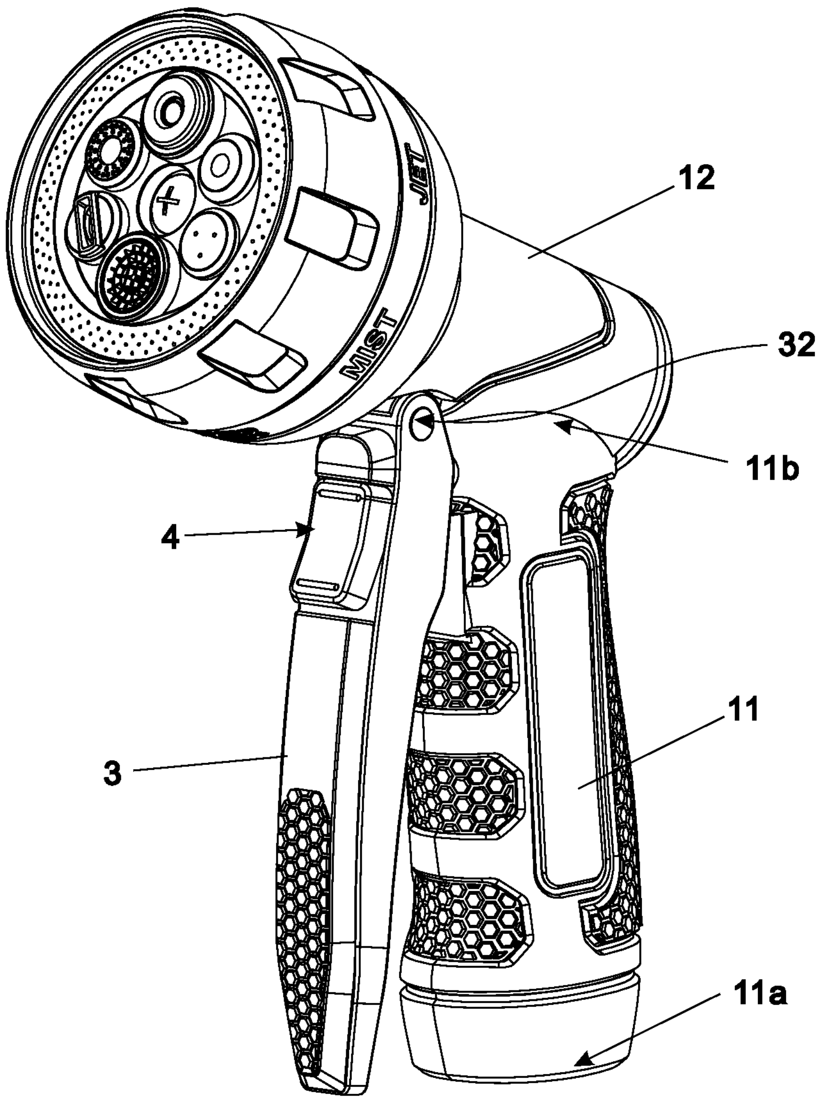
FIG. 2 is a perspective view of a main body assembled with a switch part of an embodiment according to the present invention.
Figure 4:
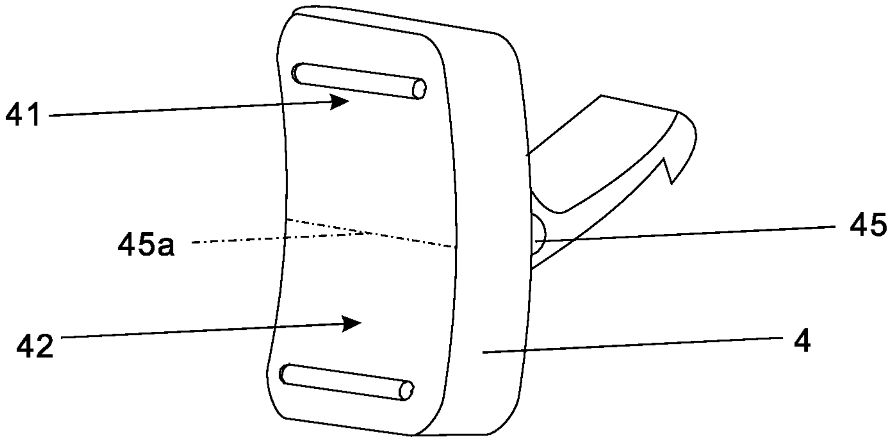
FIG. 4 is another perspective view of a switch part of an embodiment according to the present invention.
Figure 5:
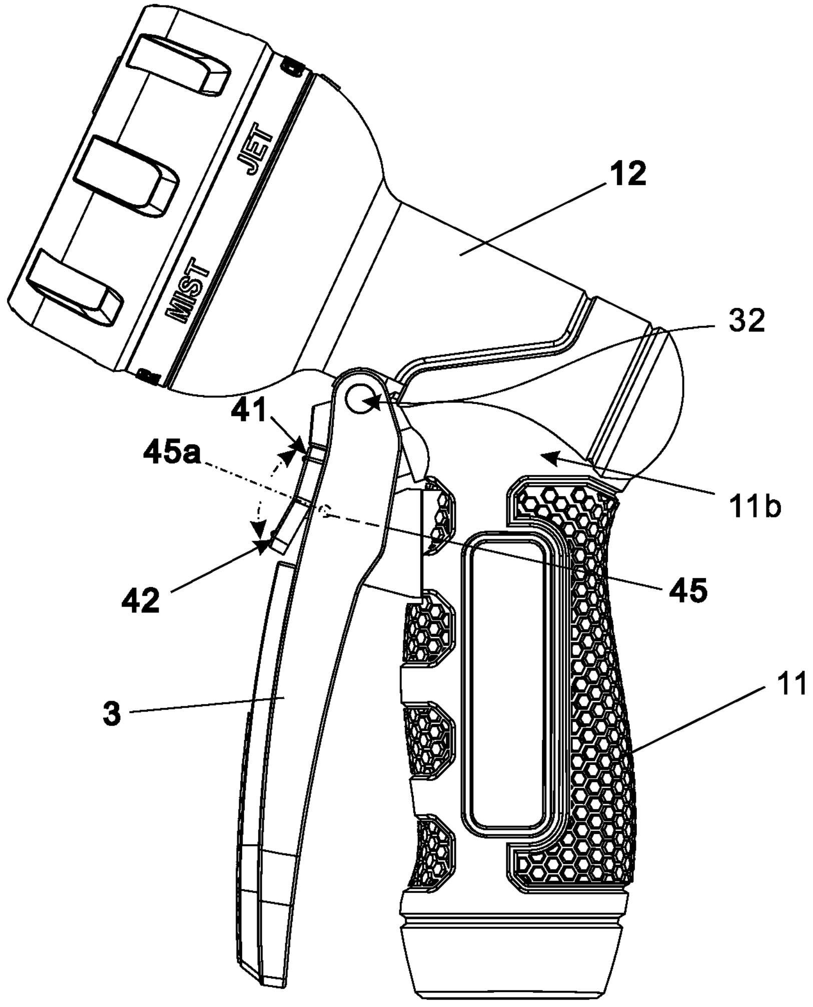
FIG. 5 is a side view of an embodiment according to the present invention.
Figure 6:
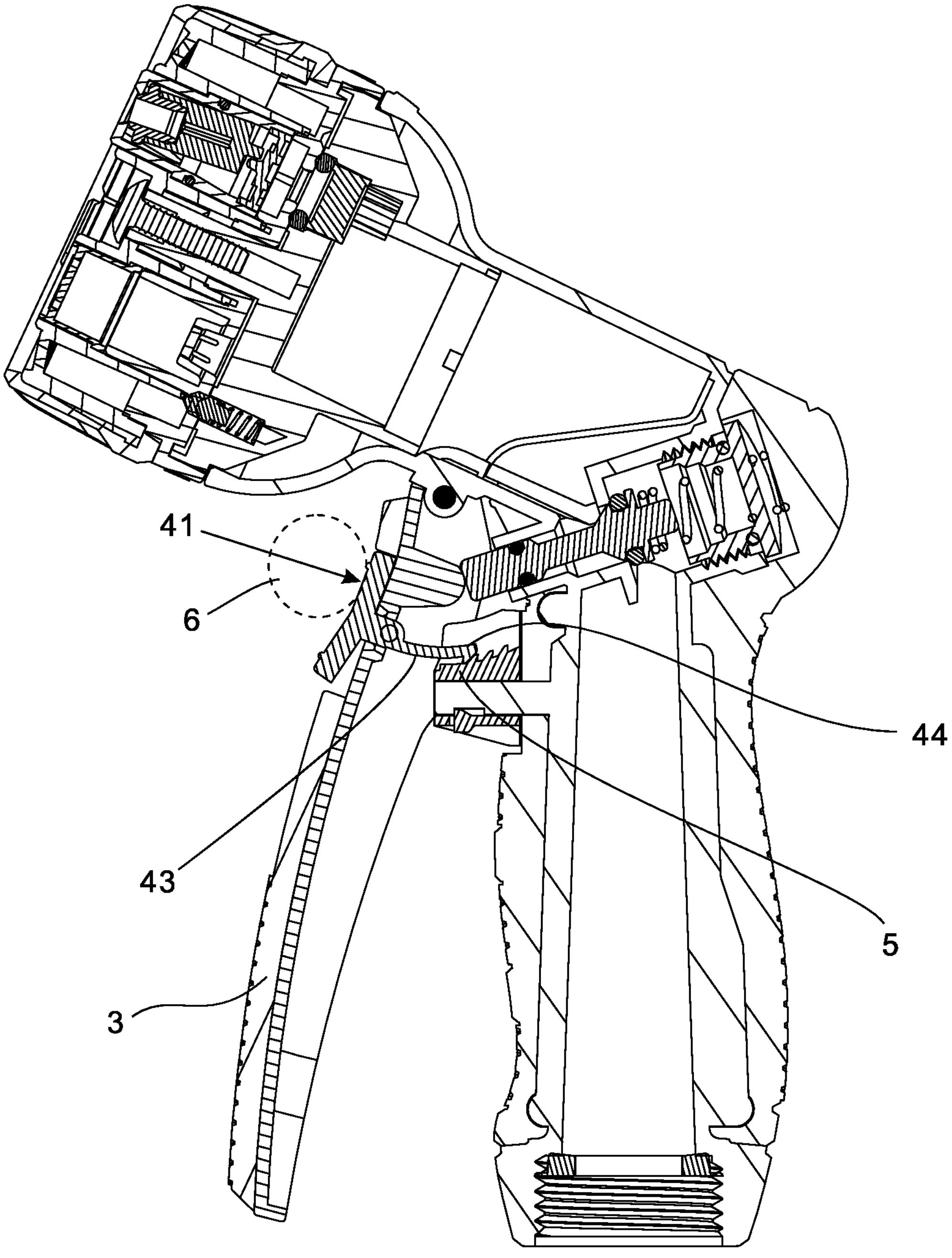
FIG. 6 is a partial enlarged view of a section of an embodiment according to the present invention.

Referring to FIG. 1-6, a water spray gun includes a main body 1, an operating member 3, a switch part 4 and a positioning portion 5. The main body 1 consists of a handle portion 11 and a tube portion 12 extending from the handle portion 11. The handle portion 11 is a part of the main body 1 which allows users to hold while the tube portion 12 is provided with a spray head 121. A connection end 11*b* is disposed on one end of the handle portion 11 connected to the tube portion 12. As shown in FIG. 6, the main body 1 encloses a passage which is formed by a water-inlet portion 1*a* located at the handle portion 11 and a water-outlet portion 2*a* extending to the spray head 121. Referring to FIG. 1 and FIG. 2, a water-intake end 11*a* arranged at the other end of the handle portion 11 is a water-intake opening of the water-inlet portion 1*a* and is able to be connected to a water hose connector for supplying water into the water-inlet portion 1*a*. The water-outlet portion 2*a* is connected to the spray head 121 for outflow of water through the spray head 121. The spray head 121 is provided with a plurality types of spray nozzles and one of the spray nozzles is selected for outflow of water. A chamber 14 is arranged at a connection between the water-inlet portion 1*a* and the water-outlet portion 2*a* while a channel 15 is located between and communicating the chamber 14 and the water-outlet portion 2*a* for allowing water flowing from the water-inlet portion 1*a* to the water-outlet portion 2*a*. A control assembly is mounted in the chamber 14 for control of water outflow and adjustment of the amount of water outflow in the passage.

As shown in FIG. 6, the control assembly includes a valve stem 16, a spring 17 and the positioning portion 5. The valve stem 16 includes a front end 161, a rear end 162 and an enlarged portion 163 disposed close to the rear end 162. The front end 161 of the valve stem 16 is mounted in a mounting slot extending from the handle portion 11 to the outside and projecting out of the mounting slot. The rear end 162 is inserted into the chamber 14 while the enlarged portion 163 is inserted through the channel 15 and abutting against an opening of the channel 15 correspondingly. The spring 17 is arranged at the chamber 14 and the rear end 162 of the valve stem 16 is abutting against the spring 17. Thus the valve stem 16 can be moved repeatedly within the channel 15 due to the spring 17 abutting against the valve stem 16.

The positioning portion 5 is disposed on the position close to the connection end 11*b* of the handle portion 11 of the main body 1 and corresponding to the switch part 4. The positioning portion 5 is composed of a first surface 5*a* and a second surface 5*b* while at least one tooth portion is disposed on the first surface 5*a*. In this embodiment, there are three tooth portions including the first tooth portion 51, the second tooth portion 52, and the third tooth portion 53 arranged at the first surface 5*a* in turn. As shown in FIG. 1 and FIG. 6, the operating member 3 controls outflow of the water. The operating member 3 consists of a first end 31, a second end 32, a slot 33, and an abutting portion 34. The second end 32 is pivotally connected to the connection end 11*b* of the handle portion 11 to be used as a fulcrum shaft for the operating member 3 being pressed or pushed. The slot 33 is arranged close to the second end 32. The abutting portion 34 is mounted on the second end 32 and corresponding to the connection end 11*b* of the main body 1. The abutting portion 34 is abutting against the front end 161 of the valve stem 16.

Figure 3:
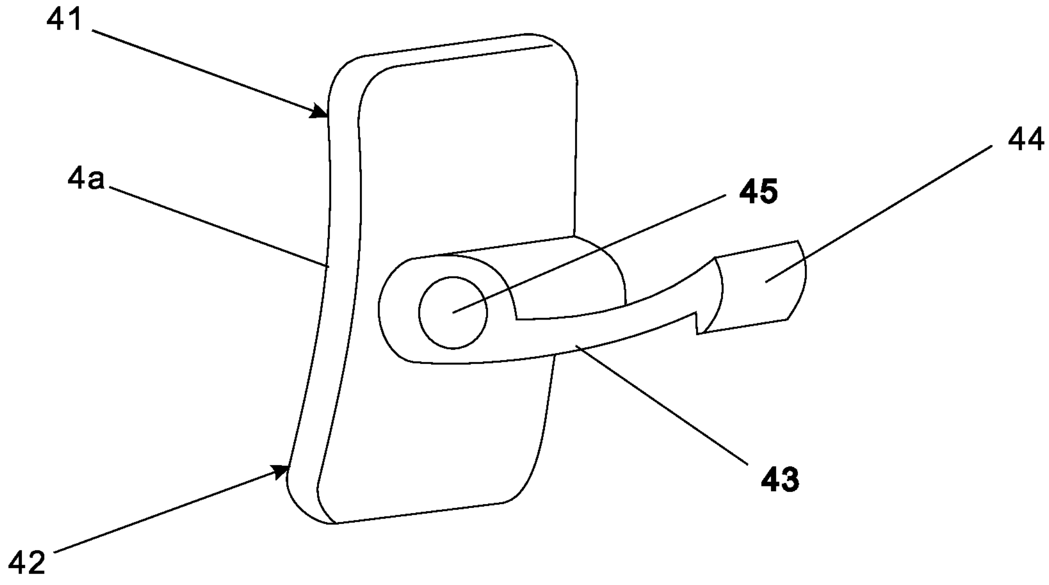
FIG. 3 is a perspective view of a switch part of an embodiment according to the present invention.

The slot 33 is located close to the second end 32 of the operating member 3 while the switch part 4 is mounted in the slot 33 and used for control of water outflow and multi-stage adjustment of the amount of the water outflow. Referring to FIG. 3 and FIG. 4, the switch part 4 has a press part 4*a* which is composed of an upper end 41, a lower end 42, a fastening portion 43, a hook portion 44 and a support shaft portion 45. The support shaft portion 45 is extending from a horizontal central line 45*a* of the press part 4*a*, mounted in the slot 33 of the operating member 3 and pivotally connected to two sides of the slot 33 of the operating member 3. The press part 4*a* is divided into the upper end 41 and the lower end 42 by the central line 45*a*. The fastening portion 43 is extending from the support shaft portion 45 and is an elastic part. The hook portion 44 facing downward is formed on a rear end of the fastening portion 43 and is engaged with one of the tooth portions of the positioning portion 5 selected. The hook portion 44 of the switch part 4 is engaged with or released from the tooth portion of the positioning portion 5 selected by user's finger pushing against the upper end 41 or the lower end 42 of the press part 4*a*. Thus the press part 4*a* can be moved downward and inward, or moved upward and inward around the support shaft portion 45, basically like a seesaw composed of the upper end 41 and the lower end 42 supported by the support shaft portion 45.

Referring to FIG. 5 and FIG. 6, the second end 32 of the operating member 3 is pivotally connected to the connection end 11*b* of the handle portion 11. When the operating member 3 is pivotally rotated to the pressed position, the abutting portion 34 of the operating member 3 is in contact with the front end 161 of the valve stem 16 and further pushing the valve stem 16 to move. The outflow of water can be stopped or allowed by the movement of the valve stem 16 and the multi-stage adjustment of the amount of the outflow can also be achieved by the movement of the valve stem 16.

Referring to FIG. 7 to FIG. 12, how the water flow is stopped or allowed and how the amount of the outflow is adjusted are described as follows.

Figure 7:
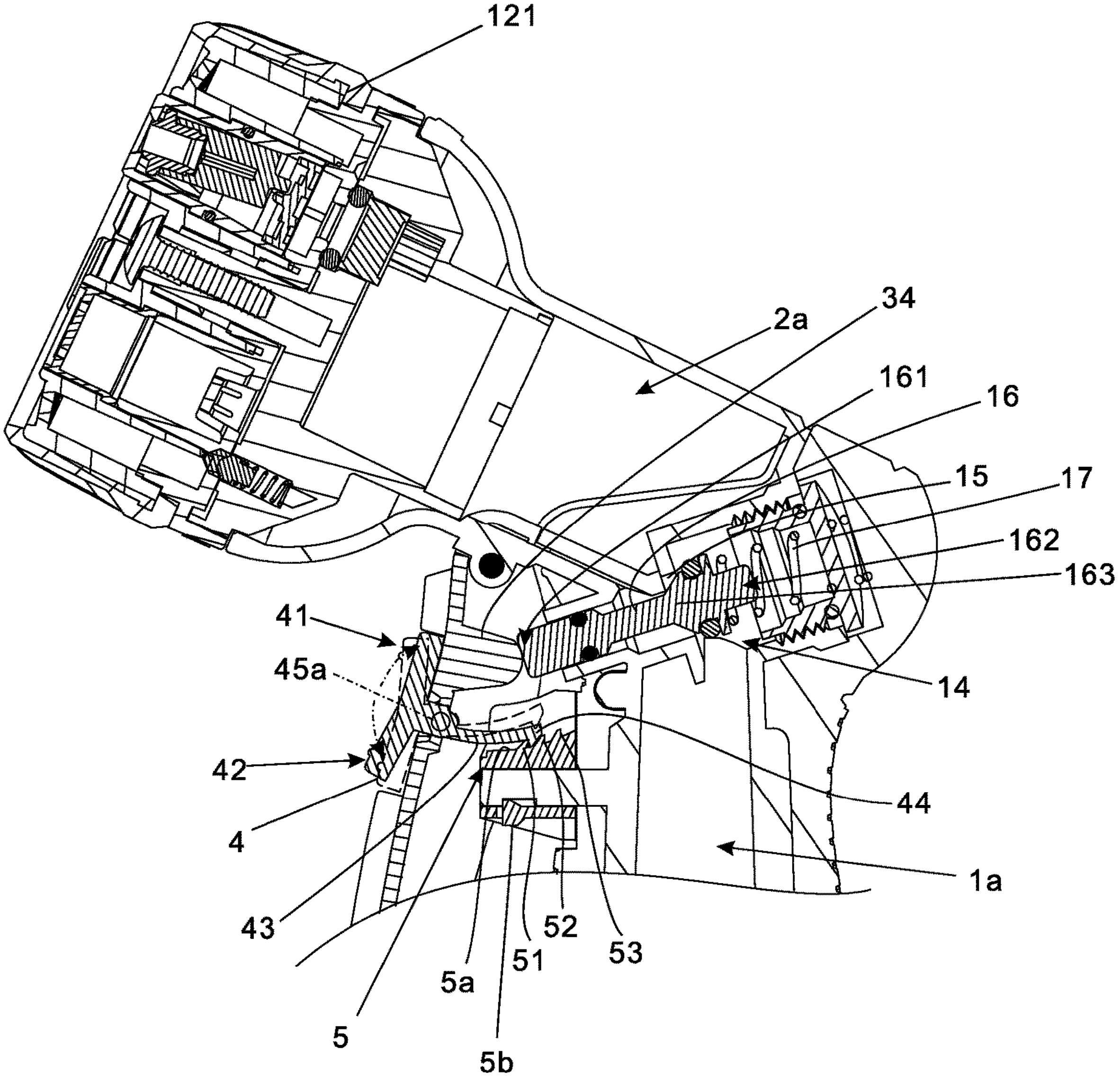
FIG. 7 is a sectional view of an embodiment in which outflow of water is going to be allowed.

Referring to FIG. 7, the user's index finger 6 is pressed on the upper end 41 of the switch part 4 naturally and ready to start the operation for outflow of water.

Figure 8:
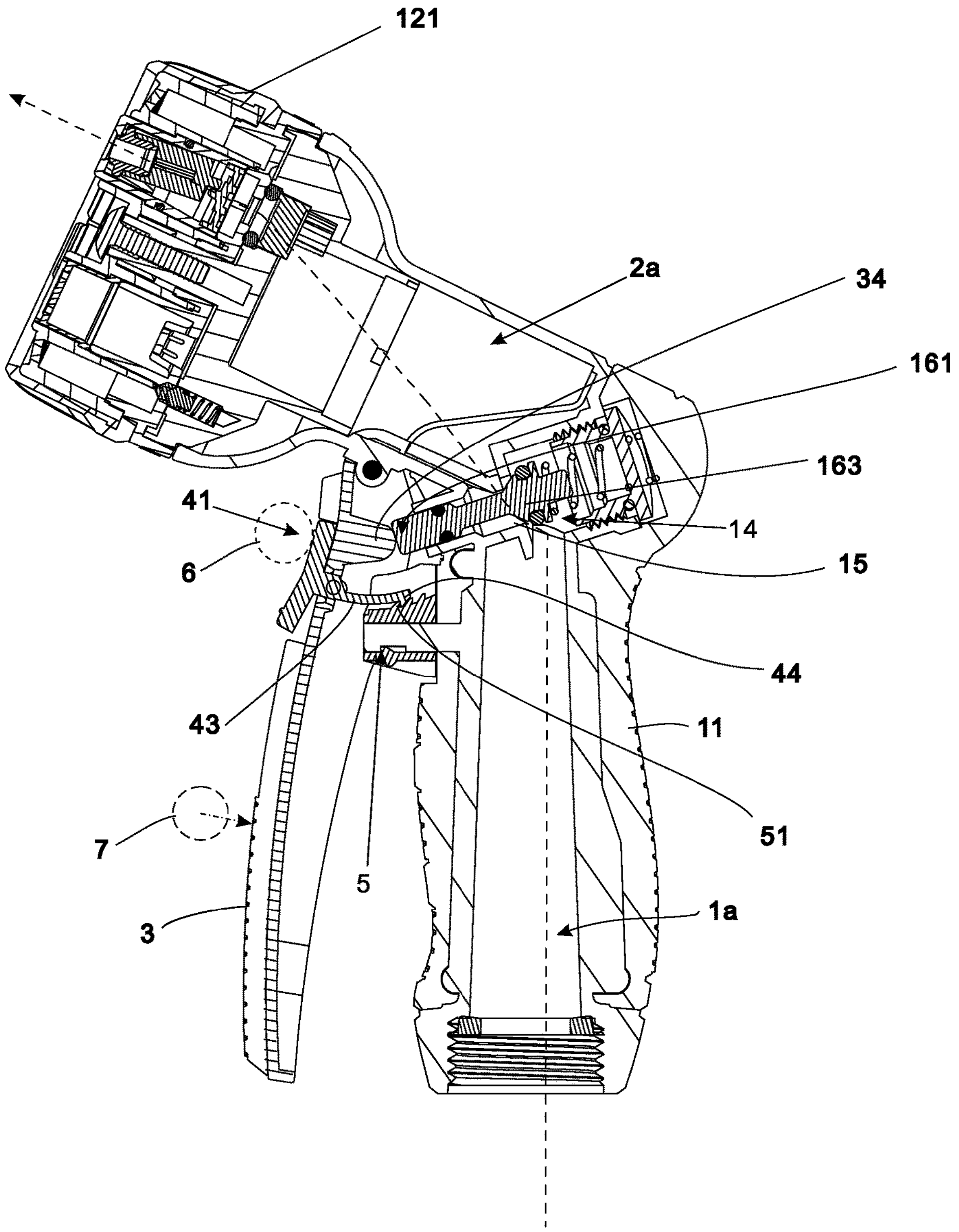
FIG. 8 is a sectional view of an embodiment showing a locked state at the first stage outflow of water.

Referring to FIG. 8, a locked state at the first stage outflow of water is revealed. As the arrow in FIG. 8 indicates, the user's index finger 6 naturally presses the upper end 41 of the switch part 4 so that the fastening portion 43 is pressed down to be abutting against the positioning portion 5. Another finger 7 synchronously presses the operating member 3 to move toward the handle portion 11 and the abutting portion 34 in contact with the front end 161 of the valve stem 16 is guided to move inward. Now the enlarged portion 163 of the valve stem 16 is moved a bit away from the edge of the opening of the channel 15 and there is a small opening formed between the chamber 14 and the water-outlet portion 2*a*. Thus water is flowing from the water-inlet portion 1*a* to the water-outlet portion 2*a* and then sprayed out through the spray head 121. The operating member 3 is not locked until the fastening portion 43 is sliding to the position where the hook portion 44 is engaged with the first tooth portion 51. This is the first stage outflow of water and only a little amount of water is flowing out at this stage.

Figure 9:
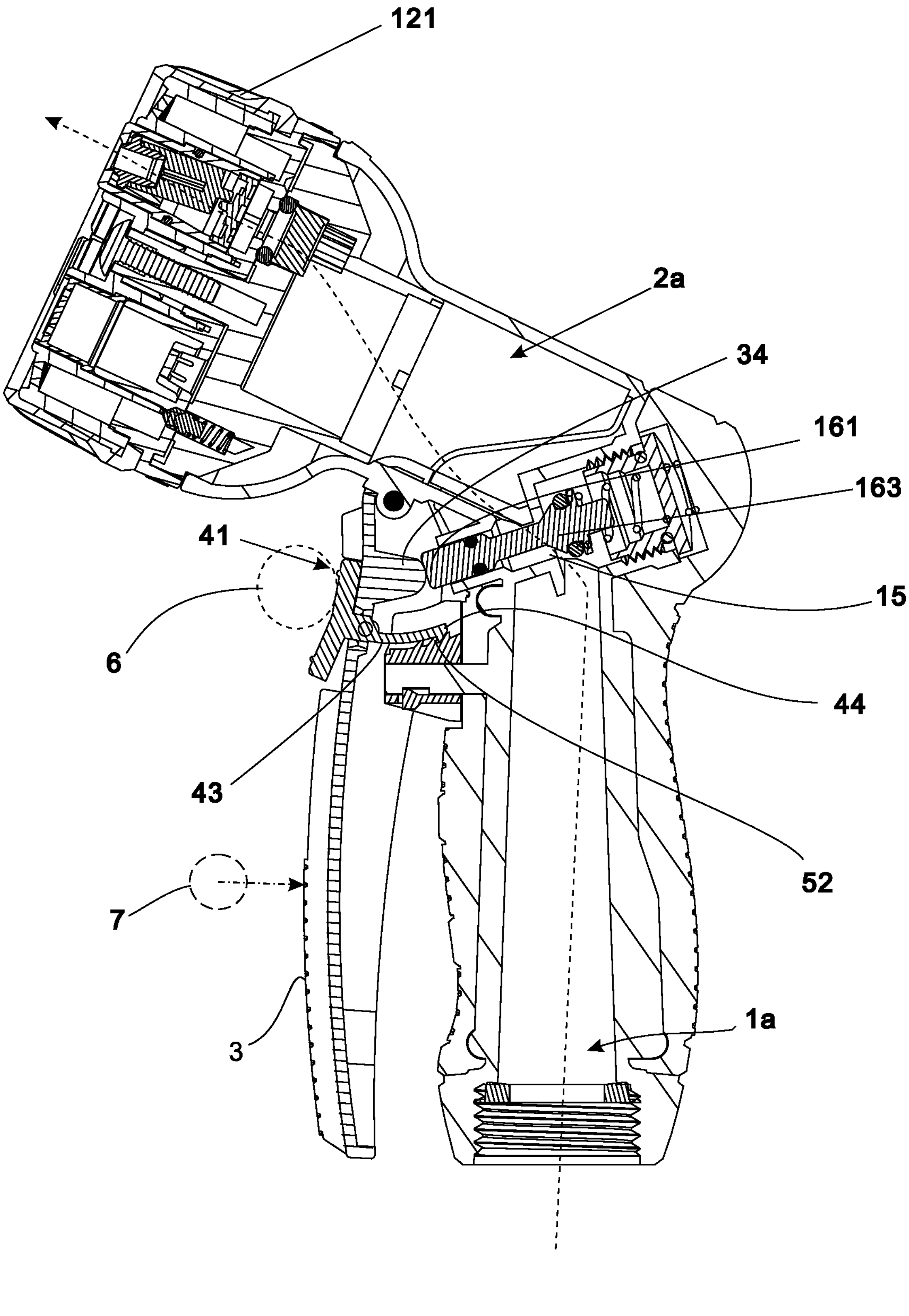
FIG. 9 is a sectional view of an embodiment showing a locked state at the second stage outflow of water.

FIG. 9 shows a locked state at the second stage outflow of the water. The user's index finger 6 naturally presses the upper end 41 of the switch part 4, as the arrow indicates, and the fastening portion 43 is pressed down to be abutting against the positioning portion 5. Another finger 7 synchronously presses the operating member 3 to move toward the handle portion 11 and the abutting portion 34 in contact with the front end 161 of the valve stem 16 is guided to move inward. At the moment the enlarged portion 163 of the valve stem 16 is moved further away from the edge of the opening of the channel 15 and the opening formed between the chamber 14 and the water-outlet portion 2*a* is getting larger than before. Thereby water from the water-inlet portion 1*a* is flowing to the water-outlet portion 2*a* and then sprayed out through the spray head 121. The operating member 3 is not locked until the fastening portion 43 is sliding to the position where the hook portion 44 is engaged with the second tooth portion 52. This is the second stage outflow of water and a bit more water is flowing out.

In a preferred embodiment, there is at least one tooth portion and at least one hook portion 44.

Figure 10:
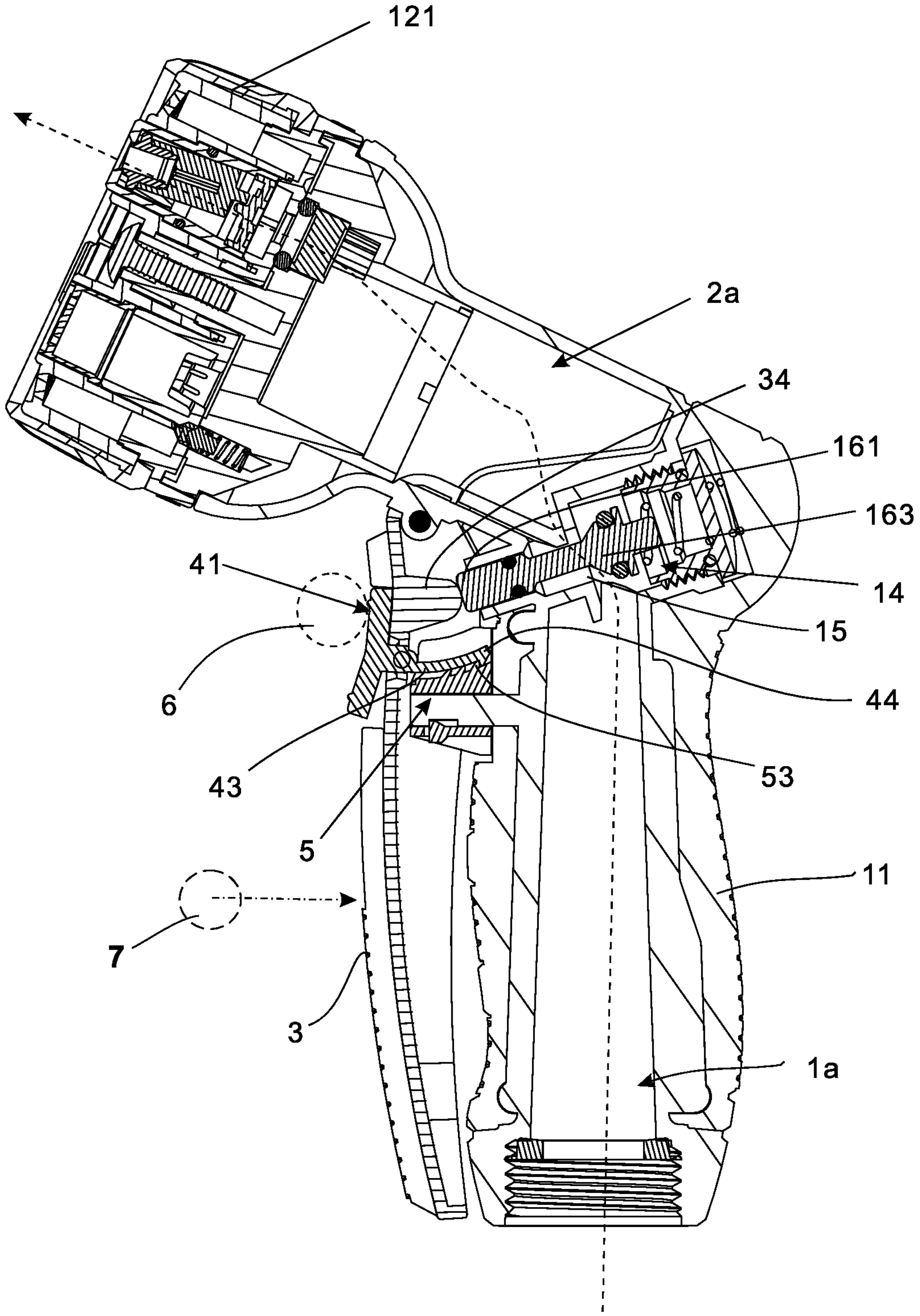
FIG. 10 is a sectional view of an embodiment showing a locked state at the third stage outflow of water.

Referring to FIG. 10, a locked state at the third stage outflow of the water is revealed. Once the user's index finger 6 naturally presses the upper end 41 of the switch part 4 (as the arrow in the figure indicates), the fastening portion 43 is pressed down to be abutting against the positioning portion 5. Another finger 7 synchronously presses the operating member 3 to move toward the handle portion 11 and the abutting portion 34 in contact with the front end 161 of the valve stem 16 is guided to move inward. Now the enlarged portion 163 of the valve stem 16 is moved further away from the edge of the opening of the channel 15 and the size of the opening formed between the chamber 14 and the water-outlet portion 2*a* is increased to the maximum limit. Thereby water from the water-inlet portion 1*a* is flowing to the water-outlet portion 2*a* and then sprayed out through the spray head 121. The operating member 3 is not locked until the fastening portion 43 is sliding to the position where the hook portion 44 is engaged with the third tooth portion 53. This is the third stage outflow of water and the maximum amount of water is flowing out.

Figure 11:
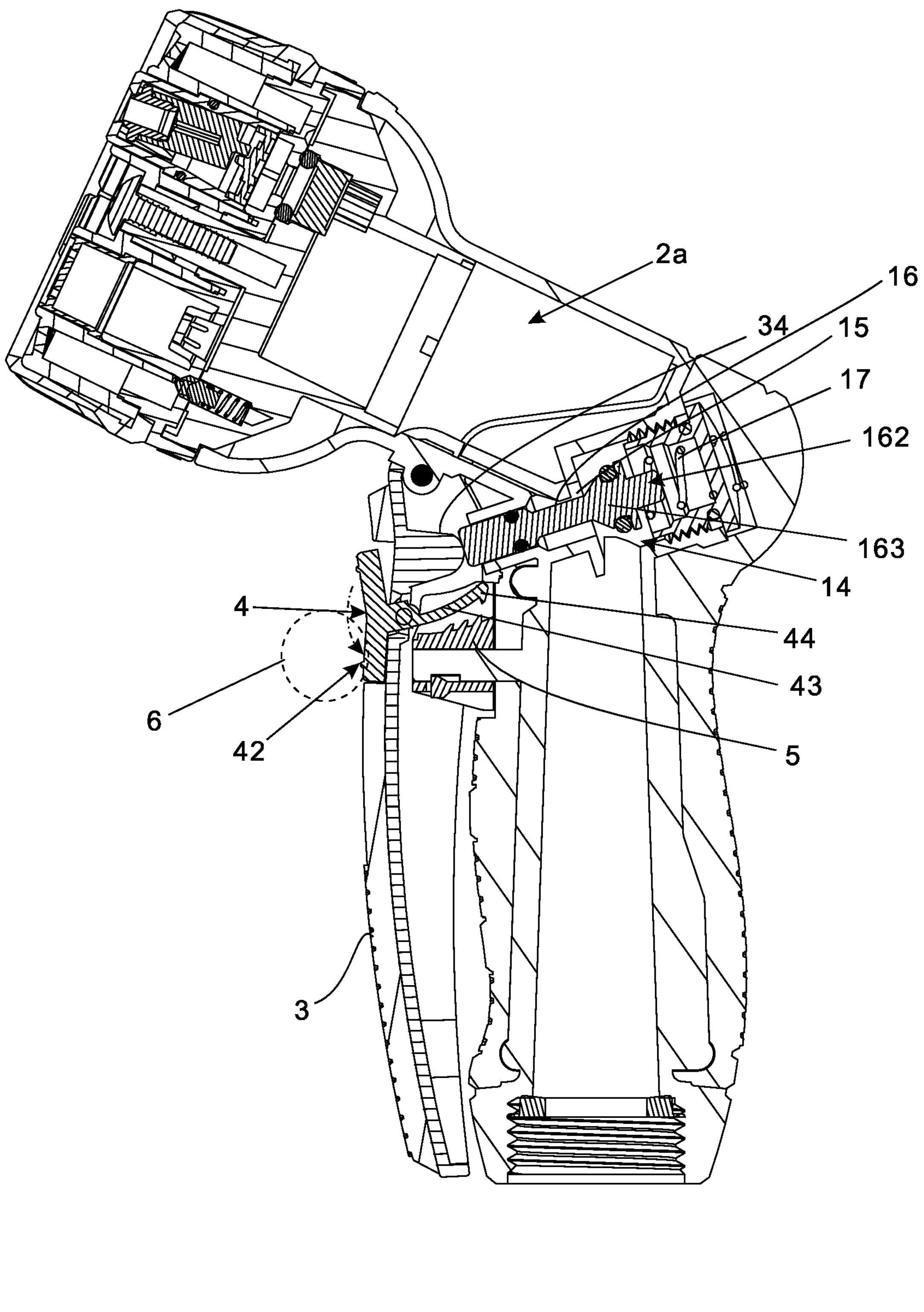
FIG. 11 is a sectional view of an embodiment showing operation for unlocking to stop outflow of water.
Figure 12:
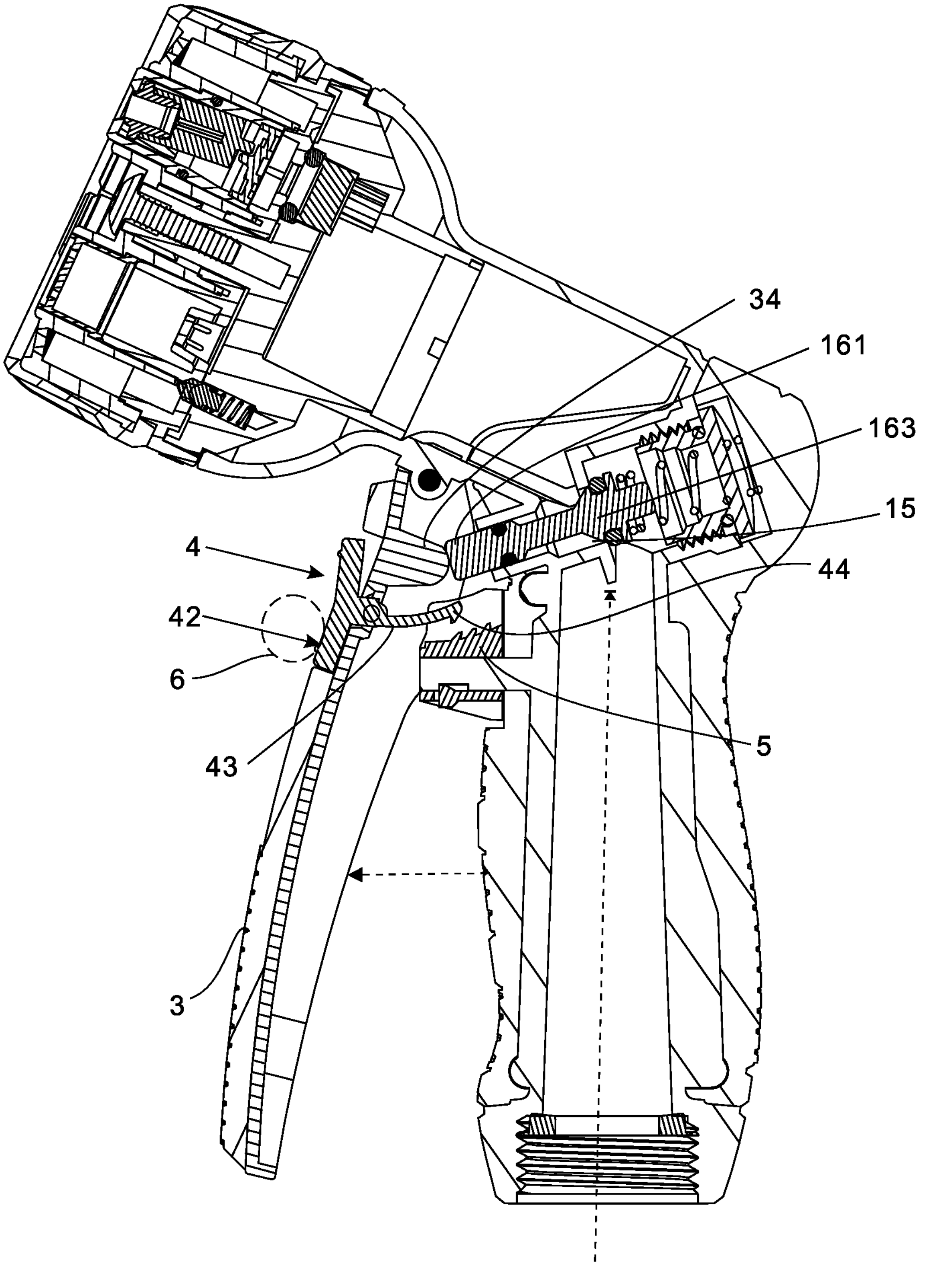
FIG. 12 is a sectional view of an embodiment in which water outflow is stopped.

Referring to FIG. 11 shows operation to stop the outflow of water while FIG. 12 shows that the water outflow is already closed. The user's index finger 6 is pressed on the lower end 42 of the switch part 4. Now the fastening portion 43 is moved upward to be away from the positioning portion 5 and the abutting portion 34 is moved outward synchronously so that the rear end 162 of the valve stem 16 is pushed by the spring 17 and the valve stem 16 is further moved outward. Then the enlarged portion 163 of the valve stem 16 is mated to the edge of the opening of the channel 15 and the opening between the chamber 14 and the water-outlet portion 2*a* is closed. Thereby water stops flowing from the water-inlet portion 1*a* to the water-outlet portion 2*a*.

Figure 13:
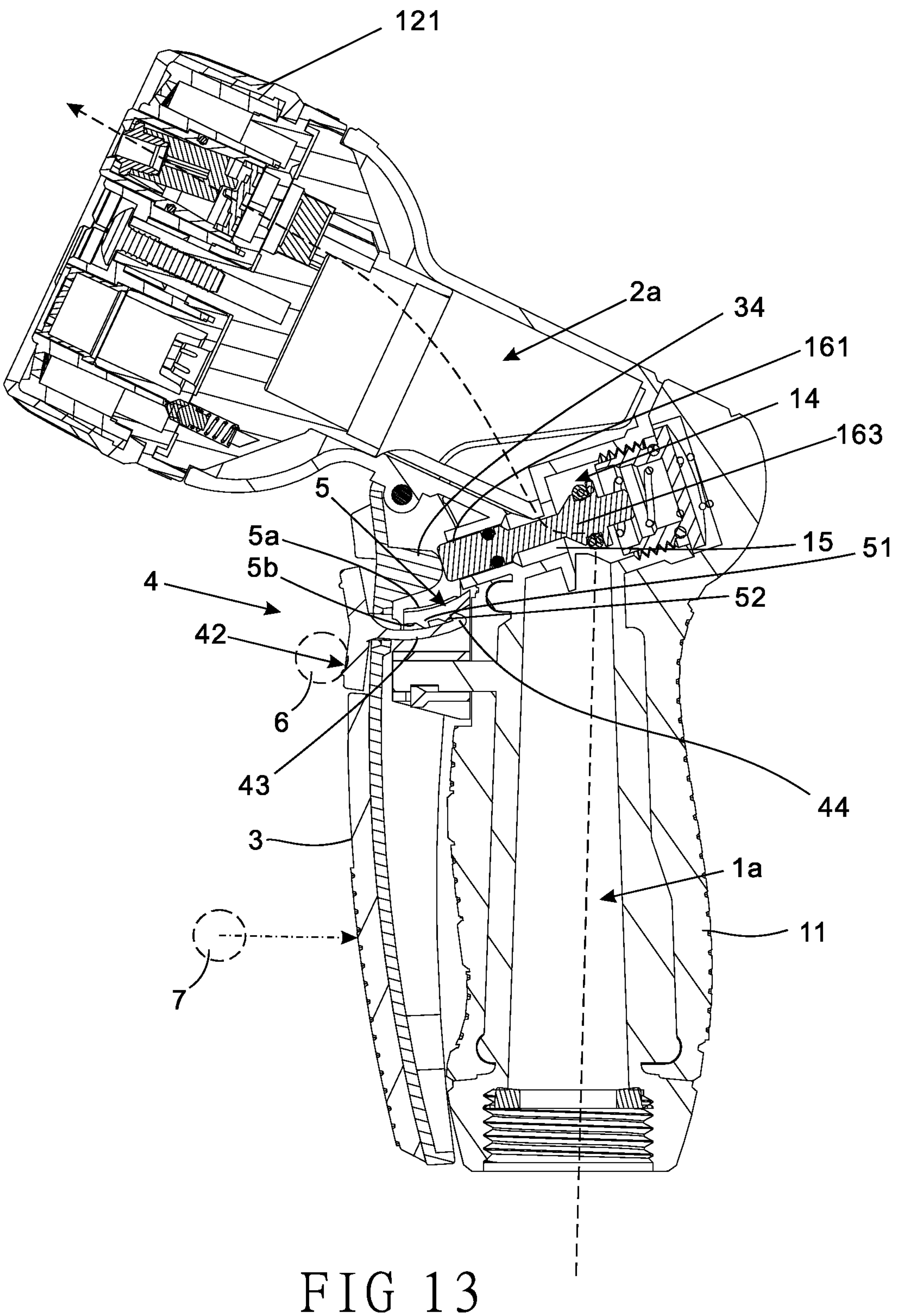
FIG. 13 is a sectional view of another embodiment with a switch part and a positioning portion according to the present invention.
Figure 14:
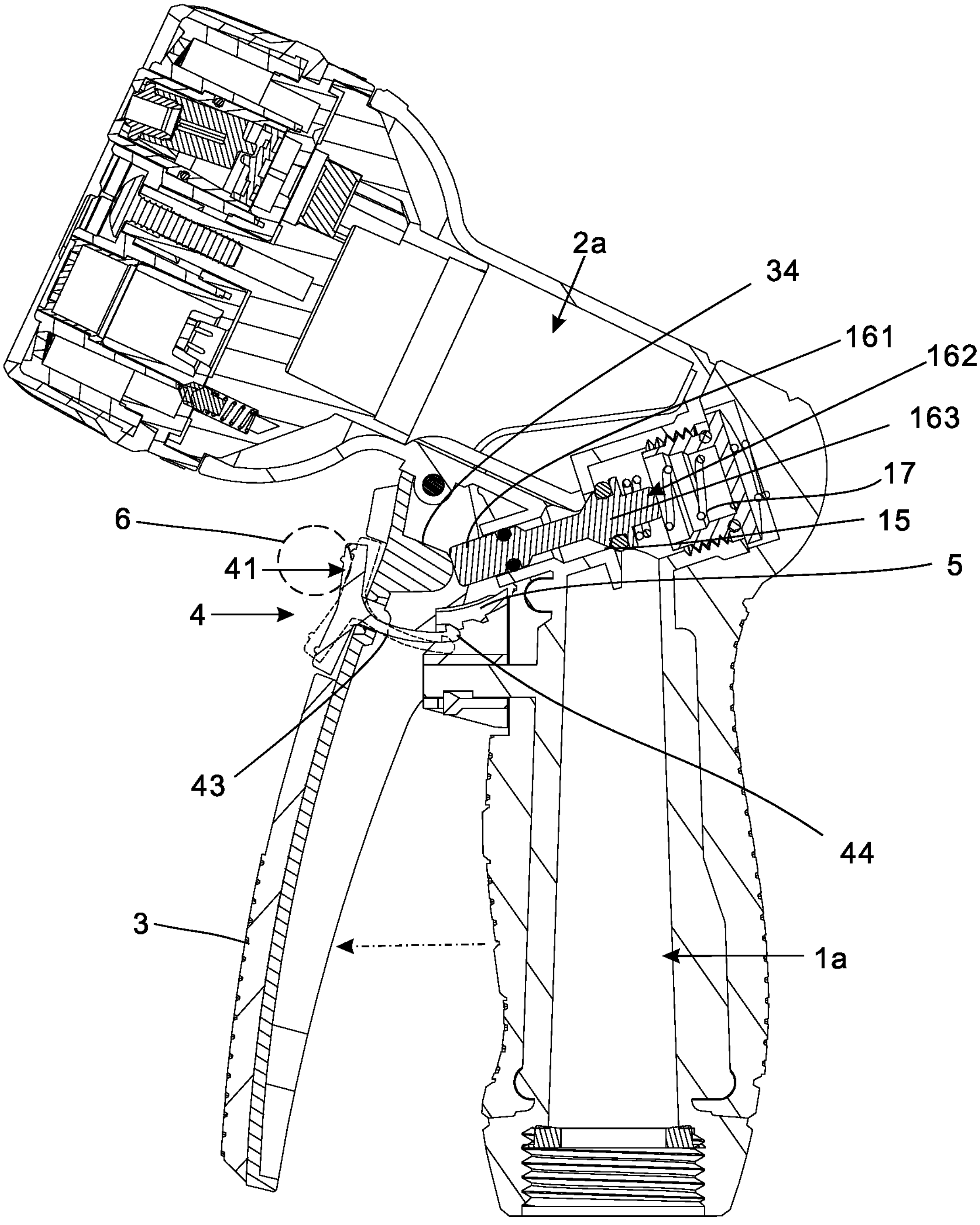
FIG. 14 is a sectional view of the embodiment in FIG. 13 in which water outflow is stopped.

In the above embodiment, the hook portion 44 formed on the rear end of the fastening portion 43 is facing downward and at least one tooth portion is arranged at the first surface 5*a* of the positioning portion 5. In another embodiment, as shown in FIG. 13 and FIG. 14, a hook portion 44 facing upward is formed on the rear end of the fastening portion 43 of the switch part 4. The positioning portion 5 includes a first surface 5*a* and a second surface 5*b* while at least one tooth portion is arranged at the second surface 5*b* in turn and used for engagement with the hook portion 44 correspondingly. The positioning portion 5 is disposed over the fastening portion 43 of the switch part 4. In this embodiment, there are two tooth portions—the first tooth portion 51 and the second portion 52. Referring to FIG. 13, water is flowing out from the water spray gun. When the operator naturally presses the lower end 42 of the switch part 4 by the index finger 6 (as the arrow in the figures indicates). Now the hook portion 44 on the fastening portion 43 facing upward is abutting against the second tooth portion 52 of the positioning portion 5 while another finger 7 is synchronously presses the operating member 3 to move toward the handle portion 11 and the abutting portion 34 in contact with the front end 161 of the valve stem 16 is also guided to move inward. Then the enlarged portion 163 of the valve stem 16 is moved away from the edge of the channel 15 and the opening formed between the chamber 14 and the water-outlet portion 2*a* is opened to the maximum degree. Thus water is flowing from the water-inlet portion 1*a* to the water-outlet portion 2*a* and then sprayed out through the spray head 121. The operating member 3 is not locked until the fastening portion 43 is sliding to the position where the hook portion 44 is engaged with the second tooth portion 52. Thereby the operating member 3 is locked at the position with the maximum water outflow. Similarly, once the hook portion 44 on the fastening portion 43 facing upward is abutting against the first tooth portion 51 of the positioning portion 5, the operating member 3 is locked at the position with the minimum water outflow.

Referring to FIG. 14, how the water outflow is stopped is revealed. The user's index finger 6 presses the upper end 41 of the switch part 4 so that the upper end 41 of the switch part 4 is moved upward and inward. Now the fastening portion 43 is pressed down so that the hook portion 44 is moved away from the tooth portion of the positioning portion 5. The valve stem 16 is no more pressed and locked and the rear end 162 of the valve stem 16 is pushed by the spring 17. Thus the valve stem 16 is moved outward to push the abutting portion 34. Thereby the operating member 3 is moved outward and now the enlarged portion 163 of the valve stem 16 is mated to the edge of the opening of the channel 15 correspondingly so that the opening between the chamber 14 and the water-outlet portion 2*a* is closed. Thereby water from the water-inlet portion 1*a* stops flowing to the water-outlet portion 2*a* and no more water is sprayed out.

In summary, the present water spray gun provides multiple functions including the control of outflow and the adjustment of the amount of water sprayed out. The above description is only the preferred embodiments of the present invention, and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

In addition, although the above embodiments with combinations of the elements and/or functions are described in the specification and related figures, but it should be considered that some other embodiments with combinations of different elements and/or functions can also be provided, without departing from the scope defined in the claims of the present invention. For example, compared with those embodiments described in detail, the embodiment with combinations of different elements and/or functions can be considered to be included in the scope of some additional claims. Benefits, other advantages, and solutions to problems have been described above with regard to specific embodiments of the present invention. However, the benefits, advantages, solutions to problems, and any elements that may cause or result in such benefits, advantages, or solutions, or cause such benefits, advantages, or solutions to become more pronounced are not to be construed as a critical, required, or essential feature or element of any or all the embodiments. Although certain terms are used herein, these terms are general and descriptive only and are not to limit the present invention.

What is claimed is:

1. A water spray gun, comprising:

a main body which includes a handle portion having a connection end and a tube portion extending from the handle portion, wherein the handle portion has a water-intake end arranged at the other end thereof, wherein the main body encloses a passage which is formed by a water-inlet portion located at the handle portion and a water-outlet portion extending to the tube portion, wherein a chamber is arranged at a connection between the water-inlet portion and the water-outlet portion, wherein a channel is located between and communicating the chamber and the water-outlet portion, wherein a control assembly is mounted in the chamber, wherein the control assembly is disposed on a position adjacent the connection end of the handle portion, wherein a positioning portion is arranged at the connection end of the handle portion and at least two tooth portions are provided on a surface of the positioning portion in turn, wherein the control assembly includes a valve stem, a spring and the positioning portion, wherein the valve stem includes a front end, a rear end and an enlarged portion disposed adjacent to the rear end, wherein the front end of the valve stem is mounted in a mounting slot extending from the handle portion to the outside and projecting out of the mounting slot, wherein the rear end is inserted into the chamber, wherein the enlarged portion is inserted through the channel and abutting against an opening of the channel correspondingly, wherein the spring is arranged at the chamber and the rear end of the valve stem is abutting against the spring, wherein the valve stem is capable of being moved repeatedly within the channel due to the spring abutting against the valve stem;

an operating member having a slot and one end pivotally connected to the connection end of the handle portion to be used as a fulcrum shaft for the operating member being selectively pressed or pushed, wherein the operating member includes a second end pivotally connected to the connection end of the handle portion, and an abutting portion mounted on the second end and corresponding to the connection end of the handle portion, wherein the abutting portion is abutting against the front end of the valve stem; and a switch part which is moveably located adjacent to the end of the operating member and pivotally connected to the handle portion and engaged with the positioning portion correspondingly, wherein the switch part includes a press part including a fastening portion, a hook portion and a support shaft portion, wherein the support shaft portion is extended from the press part and pivotally connected to the slot of the operating member, wherein the fastening portion is an elastic part extending from the support shaft portion while the hook portion is formed on a rear end of the fastening portion, wherein the press part is able to be selectively moved downward and inward, or moved upward and inward around the support shaft portion, basically like a see-saw having an upper end and a lower end supported by the support shaft portion, wherein the hook portion of the switch part is selectively upwardly engaged with or released from the tooth portion of the positioning portion being selected, thereby the switch part is capable of controlling the water outflow and provides a multi-stage adjustment of the water outflow.

2. The device as claimed in claim 1, wherein the positioning portion has a first surface and a second surface and the tooth portion is disposed on the second surface of the positioning portion.

3. The device as claimed in claim 1, wherein the quantity of the hook portion is at least one.

* * * * *